United States Patent [19]

Aoki et al.

[11] Patent Number: 5,418,899
[45] Date of Patent: May 23, 1995

[54] SIZE MAGNIFICATION PROCESSING UNIT FOR PROCESSING DIGITAL IMAGE IN ACCORDANCE WITH MAGNIFICATION FACTOR

[75] Inventors: Shin Aoki, Yokohama; Satoshi Ohuchi, Hachioji; Kaoru Imao, Yokohama, all of Japan

[73] Assignee: Ricoh Company, Ltd., Tokyo, Japan

[21] Appl. No.: 65,012

[22] Filed: May 24, 1993

[30] Foreign Application Priority Data

May 25, 1992 [JP] Japan ............................ 4-132415

[51] Int. Cl.[6] ............................................. G06F 15/00
[52] U.S. Cl. ............................................. 395/139
[58] Field of Search ............... 395/133, 139, 127, 129, 395/130; 382/47, 54, 56

[56] References Cited

U.S. PATENT DOCUMENTS 5,313,565  5/1994  Mori ................................. 395/118
5,315,693  5/1994  Hirosawa ........................... 395/128

FOREIGN PATENT DOCUMENTS 64-51765  2/1989  Japan .

Primary Examiner—Phu K. Nguyen
Attorney, Agent, or Firm—Popham, Haik, Schnobrich & Kaufman, Ltd.

[57] ABSTRACT

A size magnification processing unit processes an original digital image in accordance with a magnification factor. The size magnification unit includes a smoothing unit for processing the original digital image under a smoothing characteristic and for obtaining a smoothed image, a controller for controlling the smoothing characteristic in accordance with the magnification factor, under which characteristic the original digital image is to be processed, and an interpolation unit for performing an interpolation process in which image data of pixels arranged at sampling intervals depending on the magnification factor is calculated based on the smoothed image supplied from the smoothing unit. The interpolation characteristic under which the interpolation process is to be performed by the interpolation unit may be controlled in accordance with the magnification factor. The smoothing characteristic and the interpolation characteristic may be controlled in accordance with a type of the original image.

19 Claims, 11 Drawing Sheets

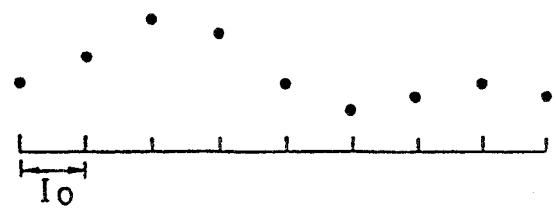
FIG. 1(a) ORIGINAL
PRIOR ART
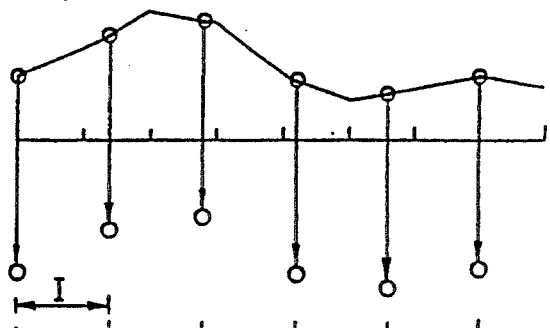
FIG. 1(b) INTERPOLATION
PRIOR ART
FIG. 1(c) VIRTUAL SAMPLING
PRIOR ART
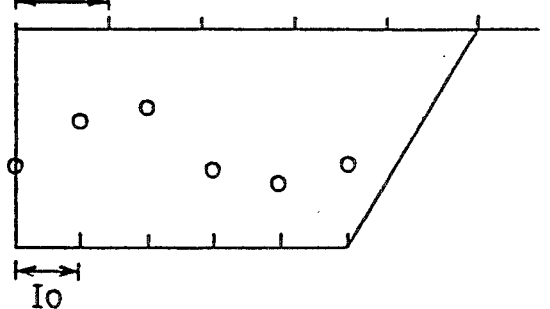
FIG. 1(d) REDUCED IMAGE
PRIOR ART
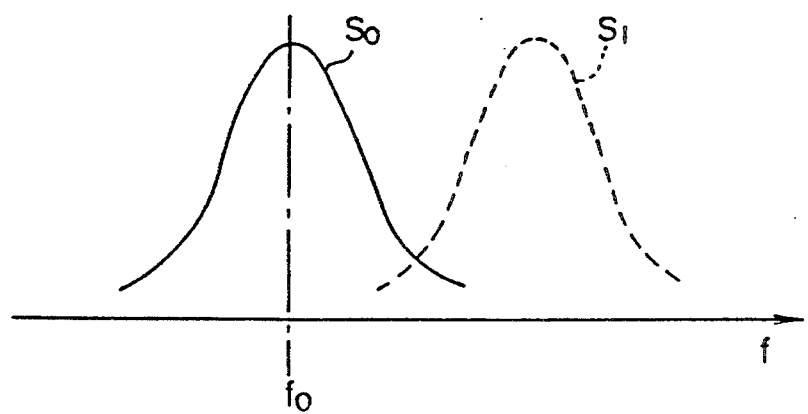
FIG. 2
PRIOR ART

FIG. 6(a)

| 0 | 0 | 0 |
|---|---|---|
| 0 | 1 | 0 |
| 0 | 0 | 0 |

FIG. 6(b)

| 0 | 1 | 0 |
|---|---|---|
| 1 | 4 | 1 |
| 0 | 1 | 0 |

FIG. 6(c)

| 1 | 1 | 1 |
|---|---|---|
| 1 | 1 | 1 |
| 1 | 1 | 1 |

FIG. 7

| MAGNIFICATION | EDGE | NOT EDGE |
|---|---|---|
| 100 ~ 95 % | (a) | (a) |
| 95 ~ 90 % | (a) | (b) |
| 90 ~ 50 % | (b) | (c) |
| LESS THAN 50% | (c) | (c) |

FIG. 9
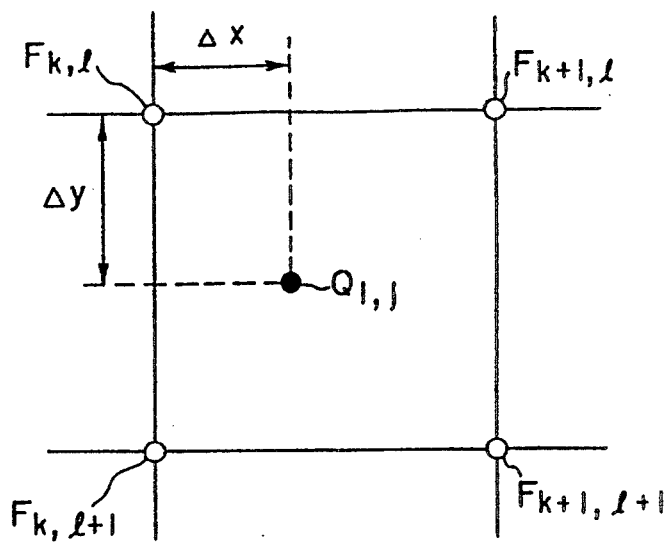
FIG. 10(a) ORIGINAL
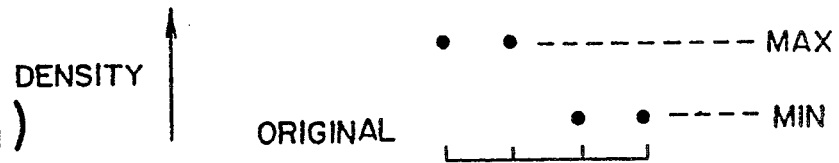
FIG. 10(b) INTERPOLATION
FIG. 10(c) VIRTUAL SAMPLTING
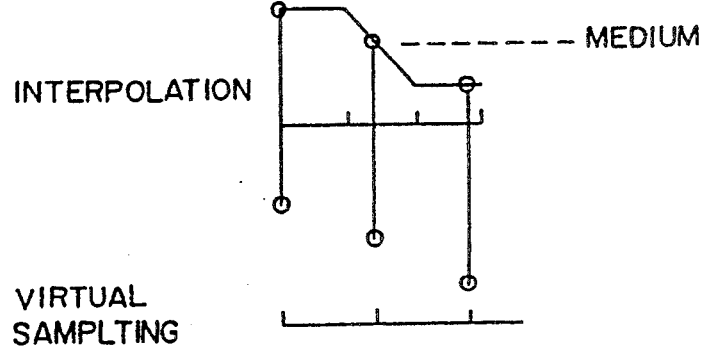
FIG. 10(d) REDUCED IMAGE

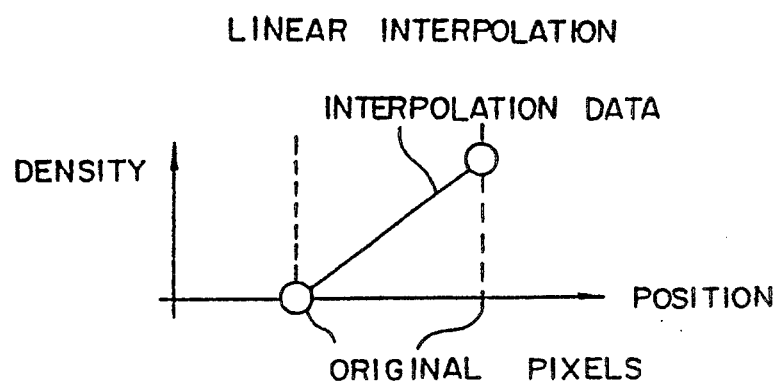
FIG. 11(a) LINEAR INTERPOLATION
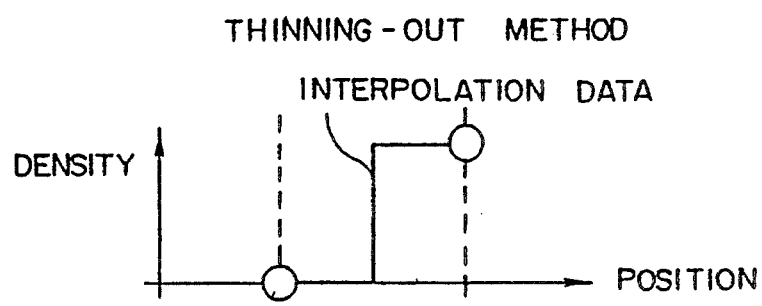
FIG. 11(b) THINNING-OUT METHOD
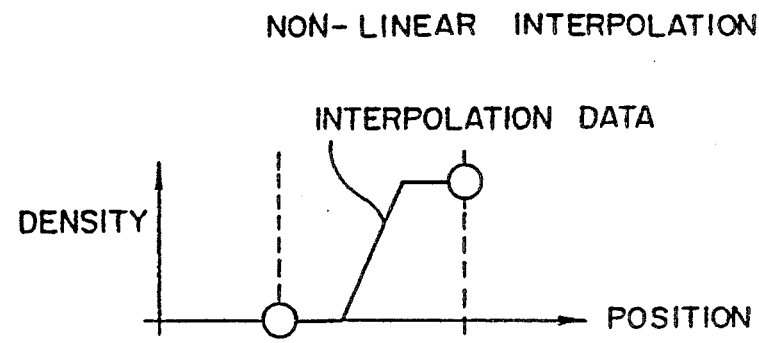
FIG. 11(c) NON-LINEAR INTERPOLATION FIG. 12(a) ORIGINAL 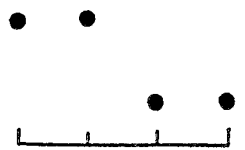
FIG. 12(b) INTERPOLATION 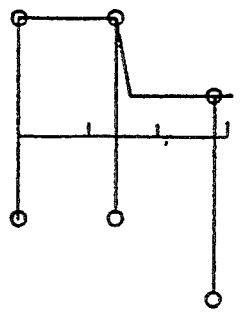
FIG. 12(c) VIRTUAL SAMPLING 
FIG. 12(d) REDUCED IMAGE 
FIG. 13
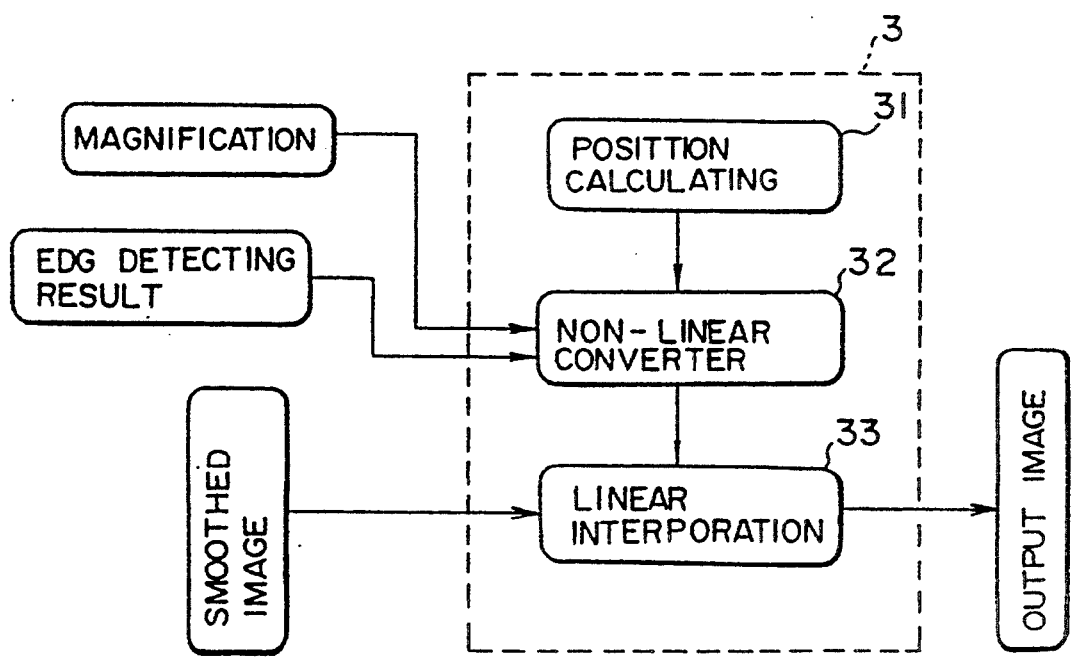

| INPUT | | OUTPUT | |
|---|---|---|---|
| ABSOLUTE COORDINATES $k, \ell$ | RELATIVE COORDINATES $\Delta x, \Delta y$ | ABSOLUTE COORDINATES $k', \ell'$ | RELATIVE COORDINATES $\Delta x', \Delta y'$ |
| k | 0 ~ 13 | k | 0 |
| k | 14 | k | 1 |
| k | 15 | k | 2 |
| k | 16 | k | 3 |
| k | 17 ~ 31 | k + 1 | 0 |

FIG. 16

| INPUT | | OUTPUT | |
|---|---|---|---|
| ABSOLUTE COORDINATES $k, \ell$ | RELATIVE COORDINATES $\Delta x, \Delta y$ | ABSOLUTE COORDINATES $k', \ell'$ | RELATIVE COORDINATES $\Delta x', \Delta y'$ |
| k | $\Delta x$ | k | $\Delta x$ | mag < 50%
(LINEAR INTERPORATION)

FIG. 17

| INPUT | | OUTPUT | |
|---|---|---|---|
| ABSOLUTE COORDINATES $k, \ell$ | RELATIVE COORDINATES $\Delta x, \Delta y$ | ABSOLUTE COORDINATES $k', \ell'$ | RELATIVE COORDINATES $\Delta x', \Delta y'$ |
| k | 0~8 | k | 0 |
| k | 9,10 | k | 4 |
| k | 11,12 | k | 8 |
| k | 13,14 | k | 12 |
| k | 15,16 | k | 16 |
| k | 17,18 | k | 20 |
| k | 19,20 | k | 24 |
| k | 21,22 | k | 28 |
| k | 23~31 | k+1 | 0 |

50% ≦ mag < 90%

| INPUT | | OUTPUT | |
|---|---|---|---|
| ABSOLUTE COORDINATES $k, \ell$ | RELATIVE COORDINATES $\Delta x, \Delta y$ | ABSOLUTE COORDINATES $k', \ell'$ | RELATIVE COORDINATES $\Delta x', \Delta y'$ |
| k | 0~13 | k | 0 |
| k | 14 | k | 8 |
| k | 15 | k | 16 |
| k | 16 | k | 24 |
| k | 17~31 | k+1 | 0 | mag ≧ 90%

SIZE MAGNIFICATION PROCESSING UNIT FOR PROCESSING DIGITAL IMAGE IN ACCORDANCE WITH MAGNIFICATION FACTOR

BACKGROUND OF THE INVENTION (1) Field of the invention

The present invention generally relates to a size magnification processing unit for processing a digital image in accordance with a magnification factor, and more particularly to a size magnification processing unit for processing a digital image in accordance with a magnification factor so that a digital image having a size corresponding to the magnification factor is obtained with little deterioration of quality thereof.

(2) Description of the related art

A digital image is obtained by sampling of image data (binary data or multi-value data) at original intervals on an original image. A size magnification process to be applied to a digital image corresponds to a resampling of image data on the digital image at virtual sampling points arranged at predetermined intervals different from the original intervals. For the sake of simplicity, FIG. 1 shows a size magnification process in which the sampling of image data is performed on a one-dimensional digital image. An original digital image is obtained by sampling of image data at original intervals (Io) as shown in FIG. 1(a). Image data is resampled on the original digital image at virtual sampling points arranged at intervals (I) corresponding to a magnification factor as shown in FIG. 1(c). Hereinafter, a magnification factor greater than 1 (100%) refers to enlargement and a magnification factor less than 1 (100%) refers to reduction. The resampled image data is arranged at the original intervals (Io) as shown in FIG. 1(d), so that a digital image having a size corresponding to the desired magnification factor is obtained. When the magnification factor is less than 1 (100%), the sampling intervals (I) corresponding to the magnification factor are greater than the original sampling intervals (Io), as shown in FIG. 1(a) and (c). In this case, a reduced digitalized image is obtained as shown in FIG. 1(d). When the magnification factor is greater than 1 (100%), the sampling intervals (I) corresponding to the magnification factor are less than the original sampling intervals (Io). In this case, an enlarged digital image is obtained.

The intervals (I) at which the image data is resampled on the original digital image differ from the original intervals (Io) used in the sampling to obtain the original digital image, as shown in FIG. 1(a) and (c). Thus, image data to be resampled at the intervals (I) on the original digital image is obtained using an interpolation technique as shown in FIG. 1(b). A linear interpolation method is well known as one type of interpolation technique. When a digital image is processed in accordance with this linear interpolation method, blurred areas occur at edges of an image obtained by the process.

The applicant has proposed, in Japanese Patent Application No.4-79976, a non-linear interpolation process applicable to the size magnification process. According to the non-linear interpolation process proposed by the applicant, the blur areas occurring at the edges of an image obtained by the process can be improved.

However, in a case where the original image includes various patterns other than line drawings, when the original image is processed in accordance with the size magnification process, not only the blur areas occur, but also moiré and/or deformation of texture occur so that the quality of an image obtained using the size magnification process deteriorates. This quality deterioration (the moiré and/or the deformation of texture) of the image may be based on aliasing noises generated by the resampling of the image data in the size magnification process.

A digital image obtained by scanning a dotted image on a printed paper includes various high-frequency components. In a pseudo half-tone image formed in accordance with a dither method or an error diffusion method, the half-tone is represented by pixel number ratio of black and white pixels on each local area. Thus, the pseudo half-tone image also includes a high-frequency component peculiar to each local area. When the above image is processed in accordance with the size magnification process, as shown in FIG. 1, a spectrum S1 generated by the sampling of the image data at the predetermined sampling frequency in the size magnification process overlaps with a high-frequency region of a space frequency spectrum So of the original digital image as shown in FIG. 2. Due to the overlapping of the spectrums S0 and S1, the aliasing noise occurs. That is, in a case where a systematic dither image having a strong periodicity is processed, the moire occurs, and in a case where a pseudo half-tone image obtained by the error diffusion method is processed, the disorder of the texture occurs.

As has been described above, when the original digital image is processed in accordance with the size magnification process, the quality of the image deteriorates based on the high-frequency components included in the original digital image. To improve the quality of the image obtained by the size magnification process the high-frequency components may be removed from the original digital image before the original digital image is processed. An image processing unit has been proposed in Japanese Laid Open Patent Application No.1-134577, in which unit a smoothing process of the original digital image is performed before the size magnification process.

However, a frequency region based on which the moire and the disorder of the texture occur depend on a magnification factor desired and on the type of original digital image. For example, the smaller the magnification factor, the larger the intervals at which the data is sampled on the original digital image and the lower the central frequency of the spectrum S1 generated by the sampling.

On the other hand., when a binary image (e.g. line drawings) is processed by the size magnification process, the moire and the disorder of the texture do not occur. To show clear edges, the high-frequency components of the original binary image is not to be removed therefrom.

SUMMARY OF THE PRESENT INVENTION

Accordingly, a general object of the present invention is to provide a novel and useful size magnification processing unit for processing a digital image in accordance with a magnification factor in which unit the disadvantages of the aforementioned prior art are eliminated.

A more specific object of the present invention is to provide a size magnification processing unit capable of obtaining an image having a space frequency characteristic depending on a magnification factor so as to undergo little quality deterioration.

The above objects of the present invention are achieved by a size magnification processing unit for processing an original digital image in accordance with a magnification factor, the size magnification unit comprising: smoothing means for processing the original digital image under a smoothing characteristic and for obtaining a smoothed image; smoothing control means, coupled to the smoothing means, for controlling the smoothing characteristic in accordance with the magnification factor under which. characteristic the original digital image is to be processed; and magnification means, coupled to the smoothing means, for performing an interpolation process in which image data of pixels arranged at sampling intervals depending on the magnification factor is calculated based on the smoothed image supplied from the smoothing means.

The above objects of the present invention are also achieved by a size magnification processing unit for processing an original digital image in accordance with a magnification factor, the size magnification unit comprising: smoothing means for processing the original digital image under a predetermined smoothing characteristic and for obtaining a smoothed image; magnification means, coupled to the smoothing means, for performing an interpolation process in which image data of pixels arranged at sampling intervals depending on the magnification factor is calculated based on the smoothed image supplied from the smoothing means; and magnification control means, coupled to the magnification means, for controlling an interpolation characteristic in accordance with the magnification factor under which characteristic interpolation process is to be performed by the magnification means.

According to the above invention, as the smoothing characteristic or the interpolation characteristic is controlled in accordance with the magnification factor, an image having a space frequency characteristic depending on a magnification can be obtained so as to undergo only little quality deterioration.

Another object of the present invention is to provide a size magnification processing unit capable of obtaining an image having a space frequency depending on a type of original image so as to minimize quality deterioration.

The above objects of the present invention are achieved by a size magnification processing unit for processing an original digital image in accordance with a magnification factor, the size magnification unit comprising: smoothing means for processing the original digital image under a smoothing characteristic and for obtaining a smoothed image; edge detecting means for detecting a pixel positioned at an edge of the original digital image; smoothing control means, coupled to the smoothing means and the edge detecting means, for controlling the smoothing characteristic in accordance with a detecting result obtained by the edge detecting means under which characteristic the original digital image is to be processed; and magnification means, coupled to the smoothing means, for performing an interpolation process in which image data of pixels arranged at sampling intervals depending on the magnification factor is calculated based on the smoothed image supplied from the smoothing means.

The above objects of the present invention are also achieved by a size magnification processing unit for processing an original digital image in accordance with a magnification factor, the size magnification unit comprising: smoothing means for processing the original digital image under a predetermined smoothing characteristic and for obtaining a smoothed image; edge detecting means for detecting a pixel positioned at an edge of the original digital image; magnification means, coupled to the smoothing means, for performing an interpolation process in which image data of pixels arranged at sampling intervals depending on the magnification factor is calculated based on the smoothed image supplied from the smoothing means; and magnification control means, coupled to the magnification means and edge detecting means, for controlling an interpolation characteristic in accordance with a detecting result obtained by the edge detecting means under which the characteristic interpolation process is to be performed by the magnification means.

According to the above present invention, as the smoothing chracteristic or the interpolation characteristic is controlled in accordance with the detecting result obtained by the edge detecting means, an image having a space frequency depending on a type of original image can be obtained so as to minimize quality deterioration.

Additional objects, features and advantages of the present invention will become apparent from the following detailed description when read in conjunction with the accompanying drawings.

BRIEF DESCRIPTION OF DRAWINGS

FIG. 1(a), (b), (c) and (d) is a diagram illustrating a conventional size magnification process.

FIG. 2 is a diagram illustrating a frequency spectrum of an original digital image and a spectrum generated by the sampling of data on the original digital image.

FIG. 6(a), (b) and (c) are a diagram illustrating digital filters used in the smoothing unit shown in FIG. 5.

FIG. 7 is a table illustrating digital filters to be selected based on magnifications and types of image.

FIG. 9 is a diagram illustrating a linear interpolation using four pixels surrounding a processed pixel.

FIG. 10(a), (b), (c) and (d) are diagrams illustrating a linear interpolation process.

FIG. 11(a), (b) and (c) are diagrams illustrating a linear interpolation process, a thining-out method and a non-linear interpolation process.

FIG. 12(a), (b), (c) and (d) are diagram illustrating a non-linear interpolation process.

FIG. 13 is a block diagram illustrating a detailed structure of the interpolation unit shown in FIG. 3.

FIG. 14 is a block diagram illustrating a detailed structure of a non-linear converter shown in FIG. 13.

FIGS. 15, 16, 17 and 18 are tables illustrating look-up tables to be provided in the non-linear converter.

FIG. 19 is a graph illustrating a relationship of data conversion in a level converter shown in FIG. 3.

DESCRIPTION OF PREFERRED EMBODIMENTS

A description will now be given, with reference to FIGS. 3-7, of a first embodiment of the present invention.

Figure 3:
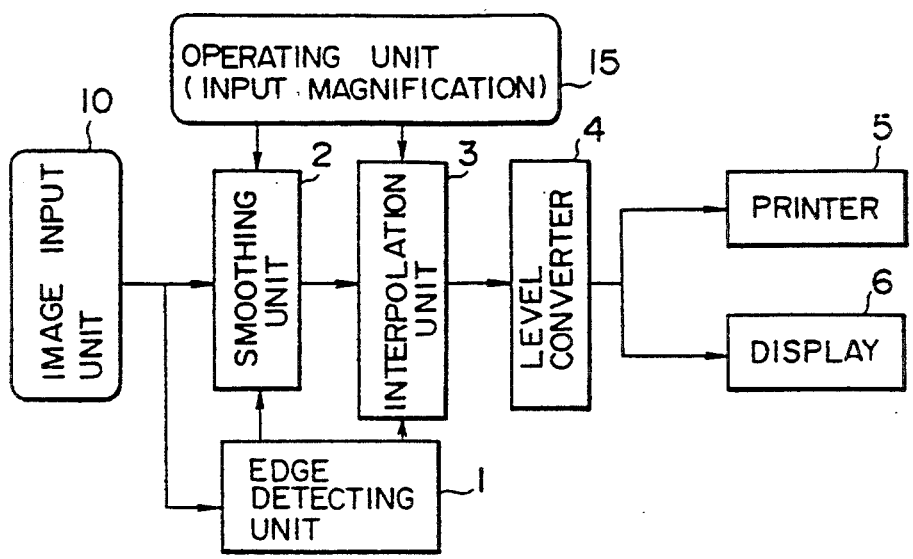
FIG. 3 is a block diagram illustrating a size magnification processing unit according to the present invention.

FIG. 3 shows an image processing device including a size magnification processing unit. The image processing device has an image input unit 10 (having, for example, a scanner), an edge detecting unit 1, a smoothing unit 2, an interpolation unit 3, a level converter 4, a printer 5, a display unit 6 and an operating unit 15 (e.g. a key board). The size magnification processing unit is formed of the edge detecting unit 1, the smoothing unit 2 and the interpolation unit 3.

The image input unit 10 samples image data at original intervals on an image formed on a document, so as to obtain an original digital image. The image input unit 10 supplies image data of the original digital image to both an edge detecting unit 1 and a smoothing unit 2 pixel by pixel. The edge detecting unit 1 determines whether or not each pixel having the image data supplied from the image input unit 10 is located at an edge of the original digital image.

Figure 4:
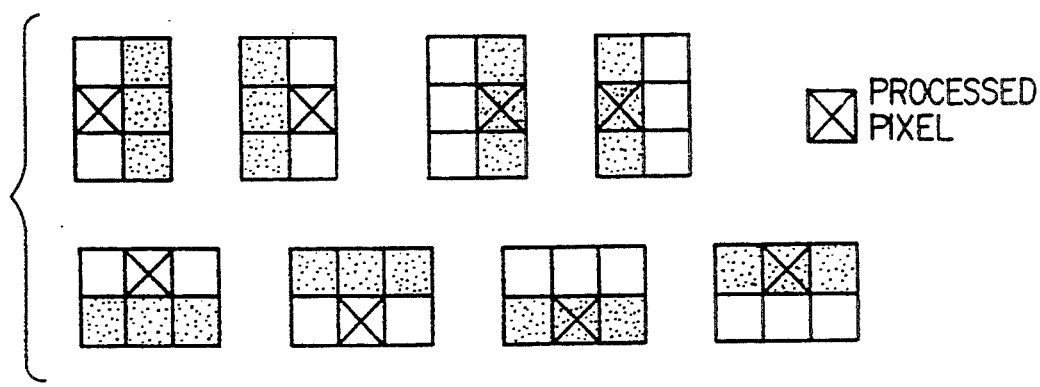
FIG. 4 is a diagram illustrating reference patterns used for determining whether or not each pixel is an edge pixel in an image.

In a case where the original digital image obtained by the image input unit 10 is a binary image, the edge detecting unit 1 determines, using templates having dot patterns as shown in FIG. 4, whether or not each pixel is located at an edge of the binary image. That is, when an arrangement of image data of 2×3 or 3×2 pixels formed of an objective pixel (a pixel under consideration) and pixels adjacent thereto is equal to a dot pattern of one of the templates shown in FIG. 4, it is determined that the objective pixel is located at an edge of the binary image. The structure (the size, the arrangement and so on) of each of the templates is not limited to those shown in FIG. 4.

In a case where the original digital image obtained by the image input unit 10 is a multi-value image, edge detecting unit 1 determines whether or not each pixel is an edge of the original digital image, as follows.

The edge detecting unit 1 calculates a value D in accordance with the following equation;

$$D=|I(i-1,j)-I(i,j)|+|I(i,j-1)-I(i,j)|$$

where I(i,j) is a density level of an objective pixel positioned at a point (i,j), I(i−1,j) is a density level of a pixel positioned at a point (i−1,j) to the left of the point (i,J), and I(i,j−1) is a density level of a pixel positioned at a point (i,j−1) upward of the point (i,j). When the value D is greater than a threshold value $D_{th}$ ($D>D_{th}$), the edge detecting unit 1 determines that the objective pixel is positioned at an end of the original digital image (the multi-value image).

Figure 5A:
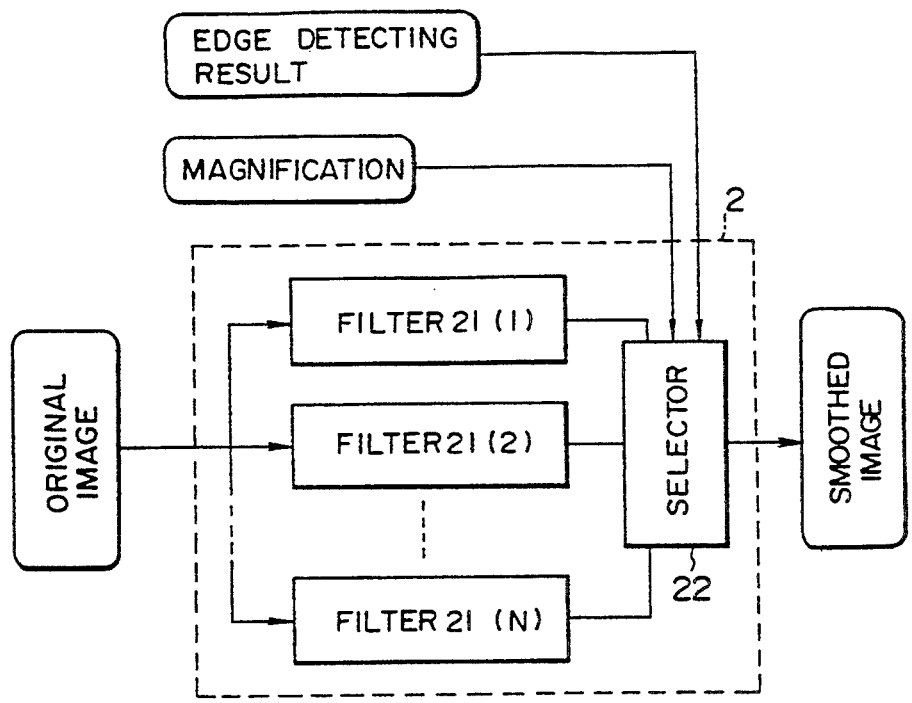
FIG. 5A is a block diagram illustrating the principle of a smoothing unit shown in FIG. 3.

The smoothing unit 2 performs a smoothing process using a low-pass filter to remove high-frequency components from the original digital image. The principle of the smoothing unit 2 is shown in FIG. 5A. Referring to FIG. 5A, the smoothing unit 2 has a plurality of filters 21(1), 21(2), . . . , 21(N), and a selector 22. Filtering characteristics of the filters 21(1), 21(2), . . . , 21(N) differ from each other. The original digital image is processed by each of the filters 21(1), 21(2), . . . , 21(N) in accordance with a corresponding filtering characteristic. The selector 22 selects one of outputs from the filters 21(1), 21(2), . . . , 21(N) based on the detecting result of the edge detecting unit 1 and based on a magnification identified by a user. The selector may also select one of the filters based on instruction information supplied from the user. The user can supply the instruction information depending on a type of original image: for example, character images or pattern images. Image data output from a filter selected by the selector 22 is output as a smoothed image from the smoothing unit 2.

Figure 5B:
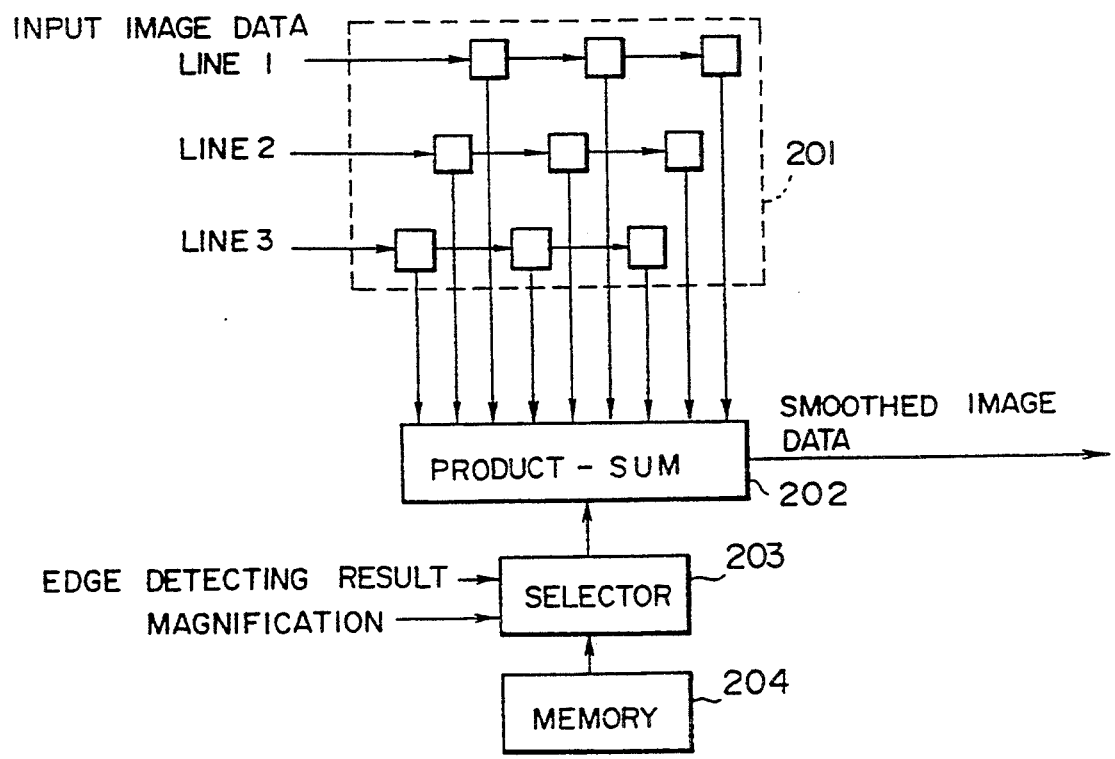
FIG. 5B is a block diagram illustrating an example of the structure of the smoothing unit.

The smoothing unit 2 is actually constituted as shown in FIG. 5B. The smoothing unit 2 shown in FIG. 5B processes the original image in accordance with the principle described above.

Referring to FIG. 5B, the smoothing unit 2 has a shift register 201, a product-sum operating circuit 202, a selector 203 and a memory 204 for storing filter coefficients. The shift register 201 is formed of three lines (LINE 1, LINE 2 and LINE 3) each of which has three stages, and image data for a 3×3 matrix is stored in the shift register 201. Image data set in respective stages of the shift register 201 is supplied to the product-sum operation circuit 202. The memory 204 stores, for example, three sets of filter coefficients, each set corresponding to one of digital filters having a 3×3 matrix form as shown in FIG. 6(a), (b) and (c). FIG. 6(a) shows a digital filter for outputting processed image data equal to input image data. That is, the filtering process is not actually performed by the digital filter shown in FIG. 6(a). FIG. 6(b) shows a digital filter for performing a filtering process with a weak smoothing. FIG. 6(c) shows a digital filter for performing a filtering process with a strong smoothing. The selector 203 selects one of the sets of filter coefficients stored in the memory 204 based on the edge detecting result supplied from the edge detecting unit 1 and based on the magnification data input from the operating unit 15 by a user. The selector 203 selects a set of the filter coefficients in accordance with a table shown in FIG. 7. Referring to the table shown in FIG. 7, when the magnification falls within a range 100%-95%, a set of filtering coefficients corresponding to the digital filter shown in FIG. 6(a) is selected for pixels based on whether the pixels are determined to be located at an edge of the original digital image or not. When the magnification falls within a range 95%-90%, a set of filtering coefficients corresponding to the digital filter shown in FIG. 6(a) is selected for pixels determined to be located at an edge of the original digital image and a set of filtering coefficients corresponding to the digital filter shown in FIG. 6(b) is selected for pixels determined to be not located at an edge of the original digital image. When the magnification falls within a range 90%-50%, a set of filtering coefficients corresponding to the digital filter shown in FIG. 6(b) is selected for pixels determined to be located at an edge of the original digital image and a set of filtering coefficients corresponding to the digital filter shown in FIG. 6(c) is selected for a pixel determined to be not located at an edge of the original digital image. When the magnification is less than 50%, a set of filtering coefficients corresponding to the digital filter shown in FIG. 6(c) is selected for pixels determined so as to be and to be not located at an edge of the original digital image. The selector 203 supplies a set of filtering coefficients which is selectively read out from the memory 204 to the product-sum operation circuit 202. The product-sum operation circuit 202 performs a product-sum operation using image data set in the respective stages arranged in the 3×3 matrix in the shift register 201 and using the filtering coefficients selected by the selector 203. That is, the filtering process is performed by the product-sum operation circuit 202 so that smoothed image data for a pixel positioned at the center of the 3×3 matrix is output from the product-sum operation circuit 202.

Figure 8A:
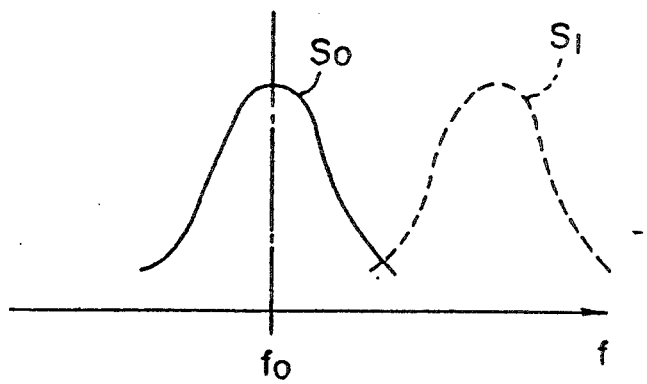
FIG. 8(a), (b) and (c) are diagram illustrating frequency spectrums of images to which the size magnification process is applied with magnifications.
Figure 8B:
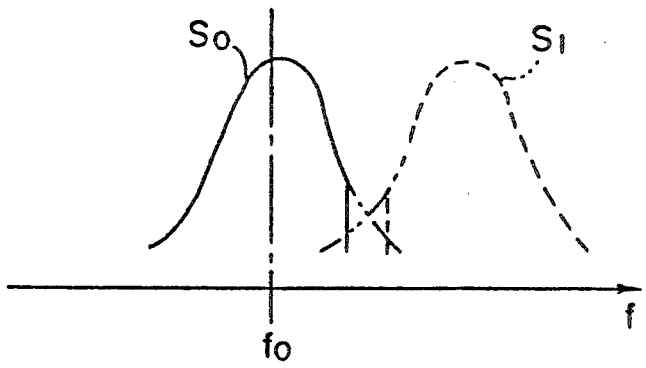
Figure 8C:
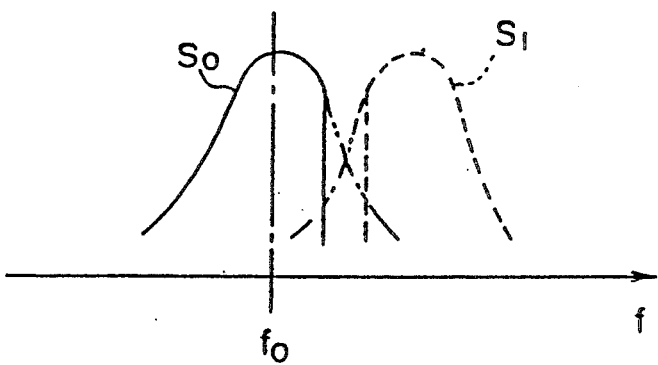

When the size magnification process is performed with a magnification falling within the range 100%–95%, the spectrum S1 generated by the sampling in the size magnification process, as shown in FIG. 8(a), does not almost overlap with the space frequency spectrum So of the original digital image. In this case, it is not necessary to remove the high-frequency components of the original digital image therefrom. Thus, the digital filter shown in FIG. 6(a) is applied to pixels in the original digital image. When the size magnification process is performed with a magnification falling within the range of 95%–90%, the spectrum S1 generated by the sampling in the size magnification process slightly overlaps with the space frequency spectrum So of the original image, as shown in FIG. 8(b). In this case, the high-frequency components within an narrow region must be removed from the original digital image as shown by a continuous line in FIG. 8(b). Thus, the digital filter shown in FIG. 6(b) is applied to pixels not located at edges of the original digital image, so that the filtering process with the weak smoothing is performed. When the size magnification process is performed with a magnification less than 90%, the spectrum S1 generated by sampling in the size magnification process largely overlaps with the space frequency spectrum So of the original digital image, as shown in FIG. 8(c). In this case, the high-frequency components within a wide region must be removed from the original digital image as shown by a continuous line in FIG. 8(c). Thus, the digital filter shown in FIG. 6(c) is applied to pixels not located at edges of the original image, so that the filtering process with the strong smoothing is performed.

As to pixels at edges of the original digital image, to prevent the above mentioned blurred area from occurring at the edge of an image obtained by the size magnification process, the smoothing process is not actually performed at the magnification equal to or greater than 90%. That is, in this case, the filter shown in FIG. 6(a) is applied to the pixels of the original digital image. In addition, in the size magnification process with a magnification falling within the range of 90%–50%, the smoothing process applied to a pixel which is located at an edge of the original digital image is weaker than the smoothing process applied to a pixel which is not located at an edge of the original digital image. In the size magnification process with a magnification less than 50%, even if pixels are located at edges of the original digital image, the filter shown in FIG. 6(c) is applied to the pixel, so that the strong smoothing process is performed.

The filter can be also selected in accordance with an instruction input by user from the operating unit 15. For example, when the original image includes many character images, the filter capable of performing a weak smoothing is selected. On the other hand, when the original image includes many pattern images, the filter capable of performing a strong smoothing is selected.

Returning to FIG. 3, the smoothed data output from the smoothing unit 2 pixel by pixel is supplied to the interpolation unit 3. The interpolation unit 3 carries out the size magnification process in accordance with a predetermined interpolation method based on the magnification data supplied from the operating unit 15.

A linear interpolation method using four pixels of an original image has been well known (e.g. Japanese Patent Laid Open Application No. 64-51765). In this linear interpolation method, pixel data (image data) Q(i,j) of a processed pixel at a position (i,j) is calculated using pixel data F(k,l), F(k+1,l), F(k,l+1) and F(k+1,l+1) of four pixels in a smoothed image data, the four pixels surrounding the processed pixel as shown in FIG. 9. The processed pixel is defined as a pixel processed in accordance with the linear interpolation method. The pixel data Q(i,j) of the processed pixel is calculated in accordance with the following equation (1):

$$Q(i,j) = ((1 - \Delta x)(1 - \Delta y)) F(k,l) + \\ (\Delta x (1 - \Delta y)) F(k+1,l) + \\ ((1 - \Delta x) \Delta y) F(k,l+1) + \\ (\Delta x \Delta y) F(k+1,l+1) \quad (1)$$

where (Δx,ΔY) indicates a relative position of the processed pixel with respect to the position (k,l) on a plane on which an original image is formed. Here, assuming that each of lattice intervals at which pixels of the original image are arranged is defined as "1" and a magnification is defined as "mag" each of lattice intervals at which pixels of an image obtained by the linear interpolation method are arranged is represented by "1/mag" on a plane on which the original image is formed. In this case, i, j, Δx and Δy in the equation (1) are represented by the following equations:

$$k = [i/mag] \quad (2)$$

$$l = [j/mag] \quad (3)$$

$$\Delta x = i/mag - k \quad (4)$$

and $$\Delta y = j/mag - l \quad (5)$$

where [] represents a Gaussian step function, the k and l are absolute coordinates of a processed pixel positioned at a point (i,j) and Δx and Δy are relative coordinates of the processed pixel.

When an image is processed in accordance with the above linear interpolation, a gradation at an edge of a binary image (e.g. a character image) is smooth, so that a blurred area occurs at the edge of the binary image. In a case where a pixel having a maximum density and a pixel having a minimum density are adjacent to each other as shown in FIG. 10 (a), if a virtual sampling point is positioned between lattice points of the original image as shown in FIG. 10(c), half-tone image data is generated for the virtual sampling point as shown in FIG. (b). Thus, a blurred area occurs at an edge of an image obtained by the size magnification process as shown in FIG. 10(d).

According to the linear interpolation method, interpolation data for each pixel between pixels of the original image is calculated as shown in FIG. 11(a). In addition, a thinning-out method is another type of interpolation method. According to the thining-out method, interpolation data for each pixel between pixels of the original is obtained as shown in FIG. 11(b). The applicant proposes, in the present application, a method for interpolating image data of the original image, which method is a compromise between the linear interpolation method and the thinning-out method. The proposed method in the present application is referred to as a non-linear interpolation method. According to this non-linear interpolation method, interpolation data for each pixel between pixels of the original image is obtained as shown in FIG. 11(c).

In a case where an original image having a steep gradation at an edge: thereof as shown in FIG. 12(a) is processed in accordance with the non-linear interpolation method, even if a virtual sampling point is positioned between pixels of the original image, interpolation data corresponding to a half-tone density hardly occur, as shown in FIG. 12(b) and (c). Thus, a reduced image having only a small number of blurred areas can be obtained as shown in FIG. 12(d).

The interpolation unit 3 is formed, for example, as shown in FIG. 13. Referring to FIG. 13, the interpolation unit 3 has a position calculating circuit 31, a non-linear converter 32 and a linear interpolation circuit 33. The position calculating circuit 31 calculates a position of each processed pixel on the original image. That is, absolute coordinates k and l and relative coordinate $\Delta x$ and $\Delta y$, all of which coordinates are indicated by the equations (2)–(5), are calculated by the position calculating circuit 31. An absolute coordinate position is defined as a position of an input pixel to be made reference to when performing an interpolation. The relative coordinate position is defined as a position of each processed pixel on each lattice of an input image.

In the embodiment, each of the lattice intervals of a processed image is represented using as a unit length one 256-th the length of a lattice interval of the original image. Thus, assuming the magnification is indicated by "mag", an interval (step) between virtual sampling points (pixels) of the processed image is [256/mag]. In this case, the absolute coordinates k and l and the relative coordinates $\Delta x$ and $\Delta y$ are calculated in accordance with the following equations (6)–(7):

$$k = [(i \times step)/256] \quad (6)$$

$$l = [(j \times step)/256] \quad (7)$$

$$\Delta x = (i \times step) \bmod 256 \quad (8)$$

and $$\Delta y = (j \times step) \bmod 256 \quad (9)$$

where mod indicates a residue operator.

Figures 14, 15:
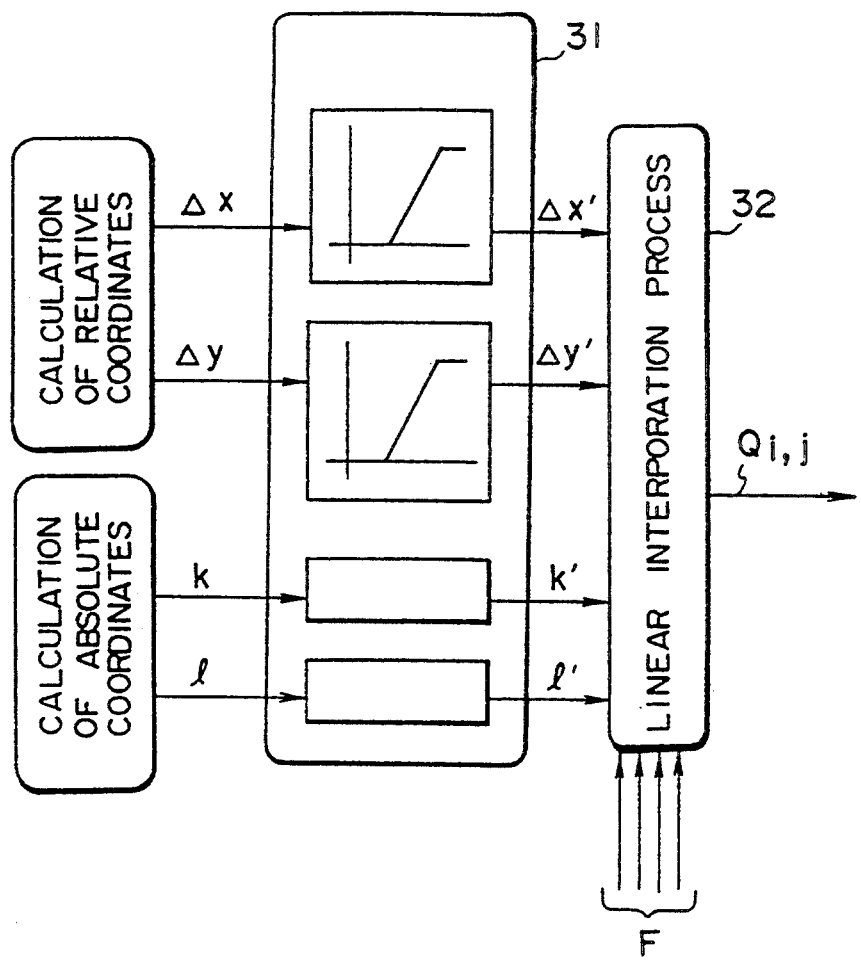

The non-linear converter 32 performs a non-linear conversion of absolute coordinates and relative coordinates calculated by the position calculating circuit 31. That is, the non-linear converter 32 inputs absolute coordinates k and l and relative coordinates $\Delta x$ and $\Delta y$, and outputs absolute coordinates k' and l' and relative coordinates $\Delta x'$ and $\Delta y'$ obtained by the non-linear conversion, as shown in FIG. 14. Actually, the non-linear converter 32 has a look-up table indicating relationships between input data and output data as shown in FIG. 15, and the non-linear conversion is performed in accordance with the relationships indicated in the look-up table. In this case, upper 5 bits are assigned to each relative coordinate ($\Delta x$ and $\Delta y$), the 5-bit relative coordinate data capable of representing 32 levels is converted into 2-bit relative coordinate data ($\Delta x'$ and $\Delta y'$) capable of representing 4 levels. The linear interpolation circuit 33 calculates interpolation data Q(i,j) in accordance with the equation (1) using the absolute coordinates k' and l' and the relative coordinates $\Delta x'$ and $\Delta y'$.

As has been described above, in this embodiment, due to the combination of the non-linear converter 32 and the linear interpolation circuit 33, the non-linear interpolation process can be performed. The linear interpolation circuit 33 may also perform the linear interpolation process using image data for three pixels surrounding a converted pixel which is a pixel to be interpolated (Japanese Patent Application No. 3-108728). If the interpolation process is performed using image data for three pixels, the linear interpolation circuit 33 can be smaller than that in which the interpolation process is performed using four pixels as shown in FIG. 9.

The characteristic of the interpolation process may be controlled in accordance with the magnification supplied by the user. When the magnification is about 100%, the blurred area easily occurs in a processed image and a thin line is hardly removed from the processed image. Thus, in this case, the interpolation process having a characteristic near that of the thinning-out method may be performed. On the other hand, when the magnification is small so as to obtain a reduced image, a thin line is easily removed from a processed image and the blurred area hardly occurs in the processed image. Thus, in this case, the interpolation process having characteristics similar to those of the linear interpolation process may be performed.

Figures 18, 19:
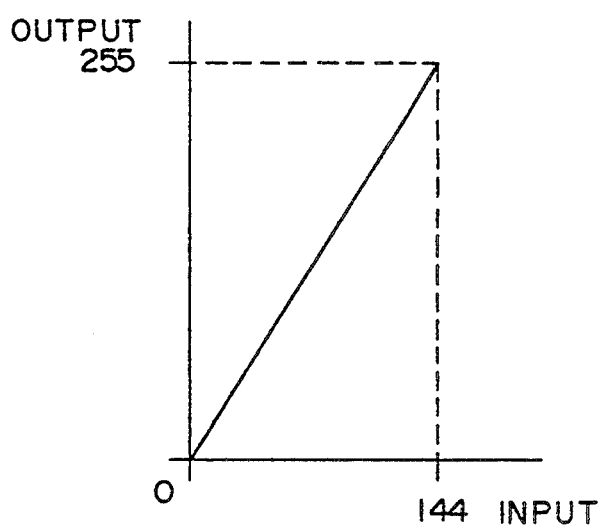

In the non-linear converter 32 shown in FIG. 13, the look-up table to be provided therein is formed of a RAM (Random Access Memory), and the contents of the RAM are updated in accordance with the magnification. For example, when the magnification is less than 50% (mag<50%), the contents of the look-up table stored in the RAM are updated as shown in FIG. 16. The absolute coordinates and the relative coordinates are converted in accordance with the look-up table shown in FIG. 16, so that the linear interpolation process is performed. When the magnification falls within a range 50%–90% (50<mag≦90%), the contents of the look-up table stored in the RAM are updated as shown in FIG. 17, and the absolute and relative coordinates are converted in accordance with the look-up table shown in FIG. 17. When the magnification is greater than 90% (mag>90%), the contents of the look-up table are updated as shown in FIG. 18. The absolute and relative coordinates are converted in accordance with the look-up table shown in FIG. 18, so that the interpolation process is carried out in the same manner as in the case of the look-up table shown in FIG. 15.

In the above respective cases, the non-linear converter 32 converts 5-bit relative coordinate data ($\Delta x$ and $\Delta y$) into 5-bit relative coordinate data ($\Delta x'$ and $\Delta y'$) capable of representing 32 levels.

The characteristic of the interpolation process to be applied to pixels positioned at edges of an image may differ from that of the interpolation process to be applied to pixels not positioned at edges of an image. In this case the characteristic of the interpolation process is controlled in accordance with the edge detection result supplied from the edge detecting unit 1. For example, when it is determined that a pixel is positioned at an edge of the original image, the interpolation process is performed in accordance with the thinning-out method. On the other hand, when it is determined that a pixel is not positioned at an edge of the original image, the interpolation process is performed in accordance with the linear interpolation method.

The characteristic of the interpolation process can be also controlled in accordance with an instruction input by user from the operating unit 15. For example, when the original image includes many character images, the interpolation process is performed in accordance with the thinning-out method. On the other hand, when the original image includes many pattern images, the interpolation process is performed in accordance with the linear interpolation method.

Returning to FIG. 3, the image data output from the interpolation unit 3 pixel by pixel is supplied to the level converter 4. The level converter 4 converts a level of the image data supplied from the interpolation unit 3 into a level suitable for printing or displaying the image. When a binary image in which each pixel can have two levels "0" and "1" is processed by the low pass filter shown in FIG. 6(C), a smoothed image is obtained in which each pixel can have ten levels "0" through "9". When the smoothed image is processed in accordance with the non-linear interpolation method described in FIG. 14, a processed image in which each pixel can have 145 levels "0" through "144" is obtained. For example, to print an image, the level converter 4 converts the multi-value data of the processed image supplied from the interpolation unit 3 into binary data, and the binary data is then supplied to the printer 5.

The level converter 4 may also convert the multi-value data into the binary data in accordance with the error diffusion method so that a half-tone image can be shown and the moire can be prevented from occurring in the binary image. Multi-value data can be also obtained by the level converter 4 operating in accordance with a multi-value error diffusion method. For example, to display an image having 16-half-tone levels, the level converter 4 can operates so as to obtain 16-half-tone image data.

The level converter 4 may convert 145 multi-value data into 256 multi-value data using a table indicating a relationship as shown in FIG. 19. The present invention is not limited to the aforementioned embodiments, and variations and modifications may be made without departing from the scope of the claimed invention.

What is claimed is:

1. A size magnification processing unit for processing an original digital image in accordance with a magnification factor, said size magnification unit comprising:
   smoothing means for processing the original digital image under a smoothing characteristic and for obtaining a smoothed image;
   smoothing control means, coupled to said smoothing means, for controlling the smoothing characteristic in accordance with the magnification factor under which characteristic the original digital image is to be processed; and
   magnification means, coupled to said smoothing means, for performing an interpolation process in which image data of pixels arranged at sampling intervals depending on the magnification factor is calculated based on the smoothed image supplied from said smoothing means.

2. The unit as claimed in claim 1, wherein said smoothing means has a plurality of filters having filtering characteristics different from each other, and wherein said smoothing control means has selecting means for selecting a filter to be activated in said smoothing means from among said filters in accordance with the magnification factor.

3. The unit as claimed in claim 1, wherein said smoothing means has filter means for performing a filtering process with a set of filtering coefficients, and wherein said smoothing control means has supplying means for supplying to said filter means a set of filtering coefficients which depend on the magnification factor and are to be used by said smoothing means.

4. The unit as claimed in claim 3, wherein said supplying means has storage means for storing a plurality of sets of filtering coefficients and selecting means for selecting a set of coefficients to be used in said smoothing means from the sets of filtering coefficients stored in said storage means in accordance with the magnification factor.

5. The unit as claimed in claim 1, wherein said smoothing control means controls the smoothing characteristic so that image smoothing increases for the decreasing magnification factor.

6. A size magnification processing unit for processing an original digital image in accordance with a magnification factor, said size magnification unit comprising:
   smoothing means for processing the original digital image under a smoothing characteristic and for obtaining a smoothed image;
   edge detecting means for detecting a pixel positioned at an edge of the original digital image;
   smoothing control means, coupled to said smoothing means and said edge detecting means, for controlling the smoothing characteristic in accordance with a detecting result obtained by said edge detecting means under which characteristic the original digital image is to be processed; and
   magnification means, coupled to said smoothing means, for performing an interpolation process in which image data of pixels arranged at sampling intervals depending on the magnification factor is calculated based on the smoothed image supplied from said smoothing means.

7. The unit as claimed in claim 6, wherein said smoothing means has a plurality of filters having filtering characteristics different from each other, and wherein said smoothing control means has selecting means for selecting a filter to be activated in said smoothing means in accordance with the detecting result obtained by said edge detecting means.

8. The unit as claimed in claim 6, wherein said smoothing means has filter means for performing a filtering process with a set of filtering coefficients, and wherein said smoothing control means has supplying means for supplying to said filter means a set of filtering coefficients which depend on the detecting result obtained by said edge detecting means and are to be used by said smoothing means.

9. The unit as claimed in claim 8, wherein said supplying means has storage means for storing a plurality of sets of filtering coefficients and selecting means for selecting a set of coefficients to be used in said smoothing means from among the sets of filtering coefficients stored in said storage means, the selection being in accordance with the detecting result obtained by said edge detecting means.

10. The unit as claimed in claim 6, wherein said smoothing control means controls the smoothing characteristic so that a weak smoothing is applied to a pixel which is determined to be positioned at an edge of the original digital image and a strong smoothing is applied to a pixel which is determined to not be positioned at an edge of the original digital image.

11. A size magnification processing unit for processing an original digital image in accordance with a magnification factor, said size magnification unit comprising:
   smoothing means for processing the original digital image under a smoothing characteristic and for obtaining a smoothed image;
   edge detecting means for detecting a pixel positioned at an edge of the original digital image;
   smoothing control means, coupled to said smoothing means and said edge detecting means, for controlling the smoothing characteristic in accordance with a combination of the magnification ratio and a detecting result obtained by said edge detecting means, under which characteristic the original digital image is to be processed; and
   magnification means, coupled to said smoothing means, for performing an interpolation process in which image data of pixels arranged at sampling intervals depending on the magnification factor is calculated based on the smoothed image supplied from said smoothing means.

12. A size magnification processing unit for processing an original digital image in accordance with a magnification factor, said size magnification unit comprising:
   smoothing means for processing the original digital image under a smoothing characteristic and for obtaining a smoothed image;
   input means for inputting an instruction;
   smoothing control means, coupled to said smoothing means and input means, for controlling the smoothing characteristic in accordance with the instruction input by said input means, under which characteristic the original digital image is to be processed; and
   magnification means, coupled to said smoothing means, for performing an interpolation process in which image data of pixels arranged at sampling intervals depending on the magnification factor is calculated based on the smoothed image supplied from said smoothing means.

13. The unit as claimed in claim 12, wherein said smoothing control means controls the smoothing characteristic so that a weak smoothing is performed when a first instruction is input by said input means an a strong smoothing is performed when a second instruction is input by said input means.

14. A size magnification processing unit for processing an original digital image in accordance with a magnification factor, said size magnification unit comprising:
   smoothing means for processing the original digital image under a predetermined smoothing characteristic and for obtaining a smoothed image;
   magnification means, coupled to said smoothing means, for performing an interpolation process in which image data of pixels arranged at sampling intervals depending on the magnification factor is calculated based on the smoothed image supplied from said smoothing means; and
   magnification control means, coupled to said magnification means, for controlling an interpolation characteristic in accordance with the magnification factor, under which characteristic the interpolation process is to be performed by said magnification means.

15. The unit as claimed in claim 14, wherein said magnification control means has conversion means for converting first position information of pixels of the smoothed image and of an image to be obtained by the interpolation process into second position information in accordance with a characteristic depending on the magnification factor, and wherein said magnification means has linear interpolation means for performing a linear interpolation process in which image data of pixels arranged at sampling intervals depending on the magnification factor is calculated based on the second position information supplied from said conversion means and the smoothed image supplied from said smoothing means.

16. A size magnification processing unit for processing an original digital image in accordance with a magnification factor, said size magnification unit comprising:
   smoothing means for processing the original digital image under a predetermined smoothing characteristic and for obtaining a smoothed image;
   edge detecting means for detecting a pixel positioned at an edge of the original digital image;
   magnification means, coupled to said smoothing means, for performing an interpolation process in which image data of pixels arranged at sampling intervals depending on the magnification factor is calculated based on the smoothed image supplied from said smoothing means; and
   magnification control means, coupled to said magnification means and edge detecting means, for controlling an interpolation characteristic in accordance with a detecting result obtained by said edge detecting means, under which characteristic the interpolation process is to be performed by said magnification means.

17. The unit as claimed in claim 16, wherein said magnification control means controls the interpolation characteristic so that a linear interpolation method is applied to a pixel which is determined to be positioned at an edge of the original digital image and a thinning-out method is applied to a pixel which is determined to not be positioned at an edge of the original digital image.

18. A size magnification processing unit for processing an original digital image in accordance with a magnification factor, said size magnification unit comprising:
   input means for inputting an instruction;
   smoothing means for processing the original digital image under a predetermined smoothing characteristic and for obtaining a smoothed image;
   magnification means, coupled to said smoothing means, for performing an interpolation process in which image data of pixels arranged at sampling intervals depending on the magnification factor is calculated based on the smoothed image supplied from said smoothing means; and
   magnification control means, coupled to said magnification means and input means, for controlling an interpolation characteristic in accordance with the instruction input by said input means, under which characteristic interpolation process is to be performed by said magnification means.

19. A size magnification processing unit for processing an original digital image in accordance with a magnification factor, said size magnification unit comprising:

smoothing means for processing the original digital image under a smoothing characteristic and for obtaining a smoothed image;

smoothing control means, coupled to said smoothing means, for controlling the smoothing characteristic in accordance with the magnification factor, under which characteristic the original digital image is to be processed; and magnification means, coupled to said smoothing means, for performing an interpolation process in which image data of pixels arranged at sampling intervals depending on the magnification factor is calculated based on the smoothed image supplied from said smoothing means;

magnification control means, coupled to said magnification means, for controlling a interpolation characteristic in accordance with the magnification factor under which characteristic interpolation process is to be performed by said magnification means.

* * * * *